United States Patent [19]
Rich et al.

[11] Patent Number: 5,635,546
[45] Date of Patent: Jun. 3, 1997

[54] PREAPPLIED SILICONE THREADLOCKER AND SEALANT

[75] Inventors: Richard D. Rich, Avon; Eerik Maandi, Rocky Hill; Paula M. Gontarz, Berlin; Hsien-Kun Chu, Wethersfield, all of Conn.

[73] Assignee: Loctite Corporation, Hartford, Conn.

[21] Appl. No.: 603,845

[22] Filed: Feb. 22, 1996

[51] Int. Cl.$^6$ ............... C09J 4/02; C08L 83/07
[52] U.S. Cl. ............ 523/176; 523/211; 524/506; 524/588; 528/24; 528/32
[58] Field of Search ............... 523/176, 211; 524/506, 588; 528/24, 32

[56] References Cited

U.S. PATENT DOCUMENTS

| | | | |
|---|---|---|---|
| 3,575,910 | 4/1971 | Thomas | 528/32 |
| 4,035,355 | 7/1977 | Baney et al. | 526/230 |
| 4,417,028 | 11/1983 | Azevedo | 525/285 |
| 5,397,812 | 3/1995 | Usami et al. | 522/13 |
| 5,482,994 | 1/1996 | Liles et al. | 524/789 |

Primary Examiner—Tae Yoon
Attorney, Agent, or Firm—Steven J. Hultquist

[57] ABSTRACT

A curable composition, having utility for threadlocking engageable members of a threaded mechanical fastener, comprising: a reactive silicone (meth)acrylate emulsified in an aqueous medium, optionally further comprising a polymerizable non-silicone (meth)acrylate monomer or oligomer; and a microencapsulated peroxy initiator which is initiatingly effective for cure of the reactive silicone (meth) acrylate. The curable composition may be usefully employed for adhesively bonding engageable structural parts, by applying the aqueous emulsion of the reactive silicone (meth)acrylate, containing a microencapsulated peroxy initiator, to at least a portion of an engagement surface of a matable part which is matably engageable with a complimentary engagement structure, to yield an emulsion-coated engagement surface, drying the emulsion-coated engagement surface to form a dried coating thereon; and thereafter engaging the surface having the dried coating thereon, with the complimentary engagement structure, to release the microencapsulated peroxy initiator and bond the matable part and complimentary engagement structure.

33 Claims, No Drawings

PREAPPLIED SILICONE THREADLOCKER AND SEALANT

BACKGROUND OF THE INVENTION

1. Field of the Invention

The invention relates to a silicone composition useful for adhesively fixturing matably engageable structural elements, such as in threadlocking of bolt/nut assemblies, so that the structural elements are adhesively bonded and sealed upon their being engaged in a final interlocked state.

2. Description of the Related Art

It is common practice in the use of threaded mechanical fasteners such as screw/nut assemblies, bolt/nut assemblies, or the like, to apply to one or more of the threadable engagement surfaces thereof, an adhesive/sealant composition, termed a threadlocking composition, for the purpose of locking and sealing the constituent members of such fasteners when they are engaged in their final interlocked state.

Such threadlocking compositions significantly increase the torque required to break or turn the engaged threaded members. Of the many threadlocking formulations known in the art, one of the most popular compositions is a co-reactive adhesive system. With this type of threadlocking system, two or more ingredients are mixed before applying the resulting composition to the threadable engagement surface(s) of the fastener on which the components in the threadlocking composition react to cure. Examples include epoxy adhesive resin formulations.

Other threadlocking formulations include reactive monomer threadlocking compositions typically comprising a monomer and a polymerization initiator of the monomer. Often it is useful to microencapsulate the monomer. U.S. Pat. No. 5,397,812 discloses a threadlocker composition in which micro-capsules enclose at least a reactive monomer of a reactive adhesive composition comprising the monomer, a polymerization initiator for the monomer, and an activator of the polymerization initiator, and are dispersed in a binder comprising a photo-hardenable resin composition. The binder composition may comprise a photoinitiator such as an onium salt, for curing thereof by suitable radiation such as ultraviolet radiation.

U.S. Pat. No. 4,417,028 describes a co-reactive system including a polymerizable monomer; an initiator, a polymerization accelerator, and a binder, in which the initiator, e.g., peroxide initator, is microencapsulated.

U.S. Pat. No. 4,035,355 discloses compositions containing acrylate-containing polyorganosiloxane reactive monomers, but neither peroxides or micro-encapsulated initiators are described.

Other co-reactive systems also exist but all have serious disadvantages such as low heat resistance, inferior strength, and poor oil tolerance. Further, the use of such compositions generally requires that the threaded members be degreased with an organic solvent before engaging the members or applying the adhesive in order to ensure adequate bonding.

Regardless of the specific formulation, the threadlocking formulation is desirably paste-like in consistency with sufficient viscosity and sag-resistance to permit ready application of the composition to the threads of the threadably matable fasteners, without subsequent dripping, sagging or displacement of the composition from the threads prior to mating and threadably locking the mechanical fastener components. Once applied to the threaded fastener, the threadlocking formulation remains on the threaded surface until the fastener is used. In use, the fastener with the preapplied threadlocking formulation thereon is contacted with mating surface or structure, e.g., a complementarily threaded engagement member, which may additionally have the threadlocking formulation previously applied to the engagement surface thereof, to facilitate the fixation of the engaged parts. In such manner, a differential pressure is applied to the matably engaged elements.

As the element bearing the threadlocking formulation is brought into engagement with complementary mating structure, the locus of engagement, which includes the previously applied threadlocking formulation, is restricted from access to the open air environment. Threadlocking formulations have therefore utilized various anaerobic curing adhesive compositions, due to the rapid curability of such compositions in the substantial absence of oxygen.

It would be extremely useful and a significant advance in the field of co-reactive threadlockers and sealants, and accordingly is an object of the present invention, to provide a reactive formulation useful for threadlocking applications, which overcomes the disadvantages of the prior art compositions.

SUMMARY OF THE INVENTION

The present invention broadly relates to a co-reactive adhesive/sealant composition, having utility for threadlocking of threadably matable engagement surfaces of threaded mechanical fasteners, or adhesive bonding of other matably engageable structural elements. Such adhesive/sealant composition does not require UV light to initiate hardening and cure, and it possesses high heat resistance, superior strength, and high oil tolerance characteristics.

The invention relates in a compositional aspect to an aqueous-based, co-reactive composition which can be directly applied to a threaded engagement surface of a mechanical fastener without the need to degrease such surface with organic solvents, since organic solvents of the types commonly employed in the art for degreasing of subsequently adhesively bonded parts, pose significant environmental problems in respect of their storage, use, and disposal.

The composition of the invention broadly comprises (i) a reactive silicone (meth)acrylate which is emulsified in an aqueous base, optionally in combination with a non-silicone organic (meth)acrylate monomer or oligomer; and (ii) a micro-encapsulated peroxide initiator dispersed in (i), which is usefully employed as a preapplied adhesive bonding composition, i.e., a composition which is deposited on one or more engagement surfaces of matably engaging parts and can be left for long periods of time prior to the actual matable engagement of such parts with one another, and which thereafter bonds the mated parts to one another.

The invention in a method aspect comprises a method for producing a threadlockable matable part useful for subsequent adhesive bonding engagement of the matable part with a complimentary engagement structure, such method comprising the steps of:

a) applying an aqueous emulsion of a reactive silicone (meth)acrylate containing a microencapsulated peroxide initiator, to at least a portion of an engagement surface of the matable part which is matably engageable with the complimentary engagement structure, to yield an emulsion-coated engagement surface; and b) drying the emulsion-coated engagement surface to form a dried coating thereon.

Subsequently, the matable part comprising the engagement surface being the dried emulsion coating, is matably engaged with the complimentary engagement structure, by the step of:

c) engaging the surface having the dried coating thereon, with the complimentary engagement structure, to bond the matable part and complimentary engagement structure.

Thus, in the above-described methodology, steps (a) and (b) may be carried out successively, and the resulting matable part having the dried emulsion coating of the threadlocking formulation on an engagement surface (which may comprise the entire areal extent of the engagement contact surface(s) of the matable part, or only a portion or portions thereof), then may be stored or otherwise maintained in a latent condition for bonding, for prolonged periods of time, until the matable part is subsequently engaged with the complimentary engagement structure and subjected to differential pressure to effect bonding engagement of the matable part with the complimentary engagement structure.

The matable parts with which the invention may be carded out includes any structural elements, e.g., bolts, screws, snap fastener elements, tongue-and-groove fastener elements, hook-and-loop fastener elements, press-fit elements, etc., which are adhesively bondably engageable with a complimentary mating structure. The structural element and complimentary mating structure may thus comprise a bolt and nut assembly, which are threadably engaged and have the dried threadlocking coating on one or both of the threaded surfaces of such mechanical fastener components.

In another aspect, the invention relates to a curable composition having utility for forming a preapplied threadlocking coating on a structural element, whereby the structural element subsequently is matably engageable with a complimentary engagement structure to yield a threadlocked assembly of such structural element and complimentary engagement structure, such curable composition comprising:

(a) an aqueous emulsion comprising a reactive silicone (meth)acrylate formed as the reaction product of:
(i) at least one first silane of formula I:

$$R_nSi(X)_{4-n} \qquad (I)$$

wherein:
each R is independently selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups,
X is a hydrolyzable functionality, and
n is an integer of from 0 to 3, and
(ii) at least one second silane of formula II:

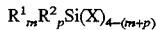

$$R^1{}_mR^2{}_pSi(X)_{4-(m+p)} \qquad (II)$$

wherein $R^1$ is a silicon-bonded (meth)acrylic functional group (as defined hereinafter) and each $R^2$ is independently selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl,
X is a hydrolyzable functionality,
m is an integer from 1 to 3 inclusive, and
m+p is an integer from 1 to 3 inclusive; and (b) a microencapsulated peroxy initiator dispersed in such aqueous emulsion.

In another compositional aspect, the invention relates to a threadlocking formulation having the following composition by weight:

| Component | Weight Percentage |
| --- | --- |
| Water | 40–60 |
| Ammonium benzoate | 0.5–5 |
| Polyacrylic acid emulsion | 2.6–10 |
| n-Butyl ferrocene | 0.01–.25 |
| Silicone (meth)acrylate resin | 20–60 |
| Ammonium hydroxide | 0.5–2.5 |
| Microencapsulated benzoyl peroxide | 0.2–5 |
| | 100% |

In yet another aspect, the invention relates to a method of adhesively bonding a structural element in matable engagement with a complimentary engagement structure along engagement surfaces of the structural element and complimentary engagement structure, to yield a threadlocked assembly of such structural element and complimentary engagement structure, such method comprising:

(a) applying to at least one of such engagement surfaces a composition comprising (i) a reactive silicone (meth) acrylate which is emulsified in an aqueous slurry and (ii) a micro-encapsulated peroxide initiator dispersed therein;

(b) drying the composition on the engagement surface(s) to which the composition has been applied; and (c) engaging the engagement surfaces of the structural element and complimentary engagement structure, to yield the threadlocked assembly of such structural element and complimentary engagement structure.

Other aspects, features, details and embodiments of the invention will be more fully apparent from the ensuing disclosure and appended claims.

DETAILED DESCRIPTION OF THE INVENTION, AND PREFERRED EMBODIMENTS THEREOF

The present invention is based on the unexpected finding that compositions comprising a silicone (meth)acrylate emulsified in an aqueous medium with a microencapsulated peroxy initiator provide highly effective bonding and sealing performance for adhesively bonding engagement surfaces of matably engageable parts, e.g., threadably engageable surfaces of threaded mechanical fasteners such as bolt-and-nut assemblies, or screw-and-nut assemblies, or engagement surfaces of any other suitable structural elements, e.g., snap fastener elements, tongue-and-groove fastener elements, hook-and-loop fastener elements, press-fit elements, etc., which are adhesively bondably engageable via complimentary mating structure.

The adhesive bonding medium of the invention, as hereinafter described in greater detail, may be usefully preapplied to the surface area of a part to be engaged with complimentary mating structure, and such preapplied medium may then be dried in any suitable manner, e.g., by ambient (room temperature) drying of the applied adhesive bonding material film, or by elevated temperature drying conditions effective for drying of the coated material, to yield a coating of the dry bonding medium, for subsequent adhesive bonding of the part bearing the dried adhesive bonding material coating, to the complimentary mating structure. Useful elevated temperature conditions for drying of the applied threadlocking composition at a temperature of about 140° F., in still air, or with flow of heated air over the applied wet film of the composition, for sufficient time, e.g., 20–30 minutes, to dry the applied mass of the composition, so that it is in a latently activatable condition.

By way of example, the threadlocking composition may be applied by trowelling the threadlocking emulsion on the surface(s) to be fixtured, at a thickness of for example 1/16 inch, so that after drying the dry film thickness may for example be on the order of 1/32 inch. Alternatively, the threadlocking composition may be applied in any suitable manner, such as for example by spraying, dipping, roller coating, or in any other suitable manner, depending on the thickness, flow and viscosity characteristics desired or present in the specific end use application of the composition.

The application and drying of the adhesive bonding composition may thus be carried out to yield a part bearing the preapplied threadlocking composition of the invention, which may then be stored or otherwise be maintained in non-bonded condition for a substantial period of time, until it is desired to adhesively bond such part to the recipient or matably engageable structure. Subsequently, at the time the part is desired to be adhesively bonded to a matably engageable structure, the part is engaged with the structure to be bonded thereto, and by imposition of pressure or compressive force on the mated component structures, rupture of the capsules containing the encapsulated initiator is effected, to cause reaction of the composition to form a threadlocked assembly of the respective structural components.

Thus, for example, the threadlocking composition of the invention may be applied to the threaded engagement surfaces of bolt fasteners, and dried thereon. Subsequently, such bolts, bearing the dried film of the threadlocking composition on their threaded surfaces, may be transported to an assembly site, where the bolts bearing the preapplied threadlocking composition may be selectively engaged with corresponding nut elements, to thereby assemble constituent members for construction of a final product structure whose constituent members are fixedly secured by the threadlocked mechanical fasteners.

The compositions of the present invention may further incorporate non-silicone (meth)acrylate monomers and/or oligomers, and provide significant advantages over prior art threadlockers and sealers. The compositions of the invention have high heat resistance, superior strength, and good oil tolerance.

The good oil tolerance characteristic of the compositions of the invention provides a significant advantage in the bonding and sealing of parts having on their engagement surfaces a thin film of previously applied oil or grease, for corrosion control purposes, particularly where the parts may be exposed to the ambient atmosphere and relative humidity conditions for extended periods of time before the parts are used. In conventional practice, such oil- or grease-coated parts are subjected to degreasing via use of organic solvents such as chlorinated hydrocarbons, which however are undesirable from the standpoint of ecological and environmental considerations, as well as legislative constraints limiting their use.

The compositions of the present invention may be directly used on the engagement surfaces of such parts bearing protective grease or oil films thereon, while achieving superior bonding and sealing characteristics.

As used herein, "reactive silicone (meth)acrylate" is a silicone composition comprising a silicon-bonded (meth) acrylic functional group.

As used herein, "a silicon-bonded (meth)acrylic functional group" means a functional group of the formula:

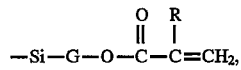

wherein:

R is H or $CH_3$; and

G is a divalent hydrocarbyl linking group.

G may for example be a divalent hydrocarbylene group selected from:

$C_1$–$C_8$ alkylene;

$C_6$–$C_{12}$ arylene;

alkylarylene having a $C_1$–$C_8$ alkyl moiety and $C_6$–$C_{12}$ arylene moiety; and arylalkylene having a $C_6$–$C_{12}$ aryl moiety and $C_1$–$C_8$ alkylene moiety.

G more preferably is an alkylene group, —$(CH_2)_x$—, wherein $1 \leq x \leq 12$.

Most preferably, G is —$(CH_2)$—or—$(CH_2CH_2CH_2)$—.

As used herein, "non-silicone (meth)acrylate" means a (meth)acrylate resin which contains no silicone (—Si—O—Si—) or silane (—Si—C—) moieties. The silicone (meth) acrylate compositions of the invention may contain non-silicone (meth)acrylate components such as (meth)acrylate monomers or oligomers, in addition to the reactive silicone (meth)acrylate components thereof.

As used herein "peroxy initiator" is a peroxide or peroxy acid free-radical polymerization initiator, which is initiatingly effective for inducing polymerization of the reactive silicone (meth)acrylate as well as any non-silicone organic (meth)acrylate components of the overall bonding/sealing composition.

The curable composition of the invention, having utility for threadlocking engageable members of a threaded mechanical fastener, or for otherwise bonding and sealing mechanical parts which are matably engageable at respective mating surfaces to which the composition is applied prior to the mating engagement of such surfaces, thus comprises a reactive silicone (meth)acrylate emulsified in an aqueous medium, and a microencapsulated peroxy initiator which is initiatingly effective for cure of the reactive silicone (meth)acrylate.

Such composition may further comprise a polymerizable non-silicone (meth)acrylate monomer or oligomer, such as polyacrylic acid, which usefully imparts dry-to-the-touch characteristics to the dried film of threadlocker composition. Non-silicone (meth)acrylic acid esters are variously described in U.S. Pat. No. 4,417,028, the disclosure of which hereby is incorporated herein by reference in its entirety. A particularly preferred (meth)acrylic monomer composition is commercially available from Rohm & Haas Company (Philadelphia, Pa.) as Acrysol® ASE-60 monomer emulsion.

The peroxy initiator utilized in the compositions of the present invention may comprise any suitable peroxide or peroxy acid initiator, such as benzoyl peroxide, cumene hydroperoxide, p-methane hydroperoxide, diisopropyl benzene hydroperoxide, pinene hydroperoxide, methyl ethyl ketone hydroperoxide, t-butyl-2-hydroxyethyl peroxide, t-butyl peroxymaleic acid and t-butyl hydroperoxide. A preferred peroxy initiator is benzoyl peroxide. The initiator is generally present in the aqueous emulsion of the silicone (meth)acrylate in amounts from about 0.01% to about 10% by weight (in the encapsulated form, as the weight of capsules), based on the weight of the silicone (meth)acrylate component. The peroxy initiator may be micro-encapsulated by any suitable means and methods known in the art, such that the microcapsules containing the peroxy initiator are rupturable by compression and/or shearing forces in the use of the composition containing the microcapsules, e.g., when the composition is applied to a threadably engageable mating surface of a threaded fastener and, after drying of the applied material, the surface bearing the dried composition is matably engaged with the complimentary structural component of the threaded fastener.

The present invention contemplates a composition which preferably is substantially devoid of organic solvents, e.g, containing no more than about 5% by weight, based on the total weight of the composition, of organic solvent media, and preferably completely free of such organic solvent media.

The curable bonding/sealing composition of the invention comprises an aqueous emulsion of the silicone (meth) acrylate component having dispersed therein a microencapsulated peroxy initiator. The silicone (meth)acrylate component of the composition may be suitably formed in accordance with the teachings of pending U.S. patent application No. 08/463,173 filed 5 June 1995 in the names of H. K. Chu, et al. for "Anaerobically Curing Silicones," the disclosure of which hereby is incorporated herein by reference, thereby producing a silicone (meth)acrylate resin which is dispersible in the aqueous medium of the composition, and which is appropriately polymerized in the presence of the peroxy initiator upon release of the initiator from the microcapsules containing same.

By way of example, the reactive silicone (meth)acrylate may be formed as a reaction product of:

(i) at least one first silane of formula I:

$$R_nSi(X)_{4-n} \quad (I)$$

wherein:
each R is independently selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups,
X is a hydrolyzable functionality, and
n is an integer of from 0 to 3, and (ii) at least one second silane of formula II:

$$R^1_mR^2_pSi(X)_{4-(m+p)} \quad (II)$$

wherein $R^1$ is a silicon-bonded (meth)acrylic functional group and each $R^2$ is independently selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl,
X is a hydrolyzable functionality,
m is an integer from 1 to 3 inclusive, and
m+p is an integer from 1 to 3 inclusive.

In the formulation described above, involving the reaction synthesis of the silicone (meth)acrylate, the second silane ingredient, comprising one or more silanes each of formula (II) above, constitutes from about 1 to about 99 mole % of the total of the first silane and second silane ingredients (each of which may comprise one or more of the respective silane species). Preferably, the second silane ingredient constitutes from about 10 to about 70 mole % of the total of the first and second silane ingredients, and most preferably from about 20 to about 50 mole of the total of the first and second silane ingredients.

The reactive silicone (meth)acrylate emulsion is formulated by dispersing the silicone (meth)acrylate in the aqueous medium, i.e., water, together with other components of the composition, e.g., a non-silicone polymerizable (meth) acrylate monomer or oligomer, and the microcapsules of the peroxy initiator may then be added under gentle agitation mixing conditions to distribute the microcapsules throughout the resulting emulsified composition, which usefully is of a slurry consistency providing good application characteristics for the end use application of the composition.

In the above-described composition, the (meth)acrylate silicone may be present in any suitable concentration, but desirably is present in an amount constituting from about 30 to about 95 weight % of the dry composition, preferably from about 50 to about 90 weight % of the dry composition, and more preferably from about 60 to about 85 weight % of the dry composition (the term "dry composition" referring to the formulation excluding water).

Such composition may optionally contain a polymerizable non-silicone organic (meth)acrylate monomer or oligomer in an amount constituting from about 1 to about 60 weight % of the composition, preferably in an amount constituting from about 5 to about 50 weight % of the composition, and more preferably in an amount constituting from about 10 to about 40 weight % of the composition.

In the above-described synthesis of the silicone resin component of the composition, involving reaction of the silanes of the formulae (I) and (II), the hydrolyzable functionality X may comprise any suitable functionality conferring hydrolyzability to the silane components. Preferably, the hydrolyzable functionality is halogen, methacryloxy, alkoxy, aryloxy, isocyanato, amino, acetoxy, oximinoxy, aminoxy, amidato, or alkenyloxy. Preferably, at least some of the functionality is chlorine. The chlorine substituents are reactive to generate hydrogen chloride under hydrolysis conditions, and such hydrogen chloride in turn is an accelerant of the reaction).

In a preferred aspect, the substituent R in the silane of formula (I) is $C_1$–$C_{12}$ alkyl or $C_6$–$C_{12}$ aryl. Illustrative species of the formula (I) include dimethyl dichlorosilane, phenyltrichlorosilane, tetrachlorosilane, trimethylchlorosilane, trimethylmethoxysilane, dimethyldimethoxysilane, phenyltrimethoxysilane, and tetraethoxysilane.

The non-silicone polymerizable monomer or oligomer optionally included in the composition of the invention may comprise a species such as 2-hydroxyethyl (meth)acrylate, polyethylene glycol di(meth)acrylate or dihydrodicyclopentadienyloxyethyl (meth)acrylate, as well as any other monomers, provided that they are compatible with the other components of the formulation. Examples include the acrylic monomers, vinyl monomers, and anhydride copolymers variously described in U.S. Pat. No. 4,417,028 issued 22 November 1983 in the name of Max Azevedo for "Preapplied Plastic Film Adhesive Composition," the disclosure of which hereby is incorporated herein by reference in its entirety. Such non-silicone monomers may for example be usefully employed in the threadlocking compositions of the present invention, to vary the surface tack and drying time characteristics, so that the preapplied threadlocker subsequent to application to the surface to be bonded, dries quickly and efficiently to form the dry, tack-free surface film of the threadlocking coating, or otherwise to vary the physical, chemical and/or performance properties of the threadlocking composition.

The (meth)acrylic functional group $R^1$ in the silane of formula (II) above may illustratively comprise a (meth) acrylate species such as (meth)acryloxyalkyl, (meth) acryloxyalkenyl, or (meth)acryloxyaryl. For example, $R^1$ may be methacryloxypropyl. $R^2$ in such formula (II) silane may comprise a species such as $C_1$–$C_{12}$ alkyl, $C_6$–$C_{12}$ aryl, alkenyl, (meth)acryloxy, or vinyl. The second silane of formula (II) may illustratively comprise a silane species such as (meth)acryloxypropyl trichlorosilane, (meth) acryloxypropyl trimethoxysilane, (meth)acryloxypropyl dimethylchlorosilane, (meth)acryloxymethyl methyldichlorosilane, or (meth)acryloxymethyl-dimethyl (meth)acryloxysilane.

In use, the composition of the invention is curable by shearingly releasing the microencapsulated peroxy initiator during engagement of the engagable members of a threaded mechanical fastener or other complementarily matable structure including an engagement surface to which the composition has been applied.

As a specific embodiment of the composition of the invention, a threadlocking formulation according to the invention may have the following composition by weight:

| Component | Weight Percentage |
| --- | --- |
| Water | 40–60 |
| Ammonium benzoate | 0.5–5 |
| Polyacrylic acid emulsion | 2.6–10 |
| n-Butyl ferrocene | 0.01–.25 |
| Silicone (meth)acrylate resin | 20–60 |
| Ammonium hydroxide | 0.5–2.5 |
| Microencapsulated benzoyl peroxide | 0.2–5 | wherein the components in the formulation total to 100%.

The invention in a method aspect contemplates a process for adhesively bonding engageable structural parts, by the steps of:

a) applying an aqueous emulsion of a reactive silicone (meth)acrylate containing a microencapsulated peroxy initiator, to at least a portion of an engagement surface of a matable part which is matably engageable with another engagement structure, to yield an emulsion-coated engagement surface;

b) drying the emulsion-coated engagement surface to form a dried coating thereon, e.g., at a temperature in the range of from about 40° C. to about 75° C.; and c) engaging the surface having the dried coating thereon, with the other engagement structure, to release the microencapsulated peroxy initiator for reaction with the reactive silicone (meth)acrylate, and thereby bond the matable part and other engagement structure to one another.

The composition of the invention may be employed to carry out the threadlocking of a mechanical fastener comprising threadably engageable engagement surfaces, by the steps of: (a) applying to at least one of the engagement surfaces a composition according to the invention, comprising a reactive silicone (meth)acrylate which is emulsified in an aqueous slurry having a micro-encapsulated peroxy initiator dispersed therein; and (b) drying the composition on the engagement surface(s) prior to engagement of the threadably engageable engagement surfaces with one another. The parts bearing the dried composition thereafter may be stored or left for extended periods of time, without adverse effect, and subsequently the threadably engageable surfaces of the mechanical fastener may be threadably engaged with one another, to compressively and/or shearingly rupture the microcapsules containing the peroxy initiator, and thereby contact the initiator with the (meth) acrylate component(s) of the bonding/sealing composition, and effect polymerization curing of the (meth)acrylate component(s).

It is understood that the composition of the invention may also include other compatible components, additives and/or ingredients normally found in known threadlockers and sealants, such as binders, emulsifiers, preservatives, pigments, anti-corrosion agents, water corrosion inhibiting agents, accelerators, fillers, lubricating agents (such as greases, oils and waxes) and/or coupling agents, within the skill of the art.

In use, the composition of the invention is coated on at least a portion of the engageable surface, e.g., threaded surface of a threaded mechanical fastener, to be sealingly bonded to a complimentary structural part or assembly. Where high strength is required the entire matable engagement surface is desirably coated, and one or all of the surfaces of the parts to be bonded may have the composition applied thereto, e.g., in a film or layer of such material. The applied composition may then be dried to remove the water therefrom, as by ambient drying, or the application of heat energy to the composition on the bonding surface, e.g., by induction, convection, radiant, infrared, and/or microwave heating. The resultant applied mass of the composition is dry to the touch once the water is evaporated.

The polymerization reaction is initiated by the action of the peroxy initiator when the microcapsules are broken by compression and/or shearing forces, when the engagement surface(s) bearing the applied (dried) composition are engaged with a corresponding mating structure, to cause the peroxy initiator to exude from the ruptured microcapsules. In this manner the locking and sealing of the engaged structures occurs and is facilitated by the assembly of the fastened structural components, e.g., the threadable engagement and tightening of the mechanical fasteners, such as a bolt and nut assembly, having the dried composition on at least a portion of at least one of the mated surfaces.

It is preferred that the pH of the threadlocking compositions of the invention be maintained in the general range of about 2 to about 12, more preferably from about 5 to about 11, and most preferably from about 7 to about 9. Adjustments to pH can be made by incorporating an effective mount of a compatible organic or inorganic base in the bonding/sealant composition. Two bases which are particularly useful in controlling pH and which do not interfere with the polymerization of the (meth)acrylate resin are $NH_4OH$ and NaOH.

The addition of a base serves to thicken the composition to a pasty consistency for ready application. The base preferably is added in a sufficient amount to obtain a desired pH in the range of from about 2 to about 12, thereby achieving good curing behavior of the composition while concurrently having appropriate consistency so that the formulation may be readily applied to the engagement surface(s) to be bonded in the subsequent use of the threadlocking composition. Values of pH outside of this range are not as advantageous to the achievement of the benefits of the invention. Lower pH levels can be used, but interfere with the curing reaction of the reactive silicone (meth)acrylate. Higher pH is undesirable, providing no performance or processing benefits.

The silicone (meth)acrylate droplet size in the aqueous emulsion of the inventive composition is desirably controlled to achieve good reaction and performance characteristics in use of the composition. Thus, the droplets must not be so small as to cause poor adhesion and subsequent peeling, and the droplets must not be so large as to prevent them from wetting the substrate surface(s). Generally the dispersed droplets are desirably in the size range of about 50 to 500 microns in diameter and preferably about 100 to 200 microns in diameter.

The upper limit of reactive silicone (meth)acrylate loading in the emulsified compositions of the invention depends on the specific (meth)acrylate species selected, however, generally useful loadings are in the range of from about 35% to 40% by weight, based on the weight of the formulation. The viscosity of the adhesive composition is suitably within a range which allows easy application of the composition in an appropriate amount, at an appropriate applied material thickness on the engagement surface(s) to be bonded with the threadlocker composition. Generally the Brookfield viscosity of the threadlocker composition is desirably between about 60,000 and about 100,000 centipoise at 2 RPM and 18,700 to 36,000 at 20 RPM, using a Brookfield RVF viscometer, with a #6 spindle and with measurements being taken at 25° C.

The invention is more fully described hereinafter with reference to the following non-limiting examples, wherein all parts and percentages are by weight, unless otherwise expressly stated.

Examples 1–4 illustrate the preparation of various reactive silicone (meth)acrylate resins which may be usefully employed to formulate corresponding threadlocking compositions in the practice of the present invention.

EXAMPLE 1

Synthesis of Resin A—Reactive Silicone (Meth) Acrylate

A reactive silicone (meth)acrylate resin, hereafter referred to as Resin A, was synthesized by the following procedure.

A 5 liter round-bottomed flask, equipped with stirrer, thermometer, addition funnel, reflux condenser, and heating mantle, was charged with 380 grams of trimethylchlorosilane (3.5 moles), 992 grams of methacryloxypropyltrimethoxysilane (4.0 moles), 99 grams of phenyltrimethoxysilane (0.5 moles), 416 grams tetraethoxysilane (2.0 moles) and 670 grams xylenes. With stirring, 250 grams of water was slowly added to the mixture by addition funnel. This addition of water caused an exotherm in the reaction volume, resulting in temperature rise to approximately 60° C. with reflux. The reaction mixture was further heated at 60° C. for an additional four hours. The mixture then was allowed to cool down to room temperature and phase separate in a separatory funnel. The bottom organic layer was collected, and solvent was removed at 70° C. in vacuum using a rotary evaporator, to yield the Resin A reactive silicone (meth)acrylate.

EXAMPLE 2

Synthesis of Resin B—Reactive Silicone (Meth) Acrylate

A 1 liter 3-necked round-bottom flask equipped with a mechanical stirrer, thermometer and addition funnel, was charged with 49.9 grams trimethylmethoxysilane, 52.8 grams dimethyldimethoxysilane, 106.9 grams phenyltrimethoxysilane and 133.9 grams methacryloxypropyltrimethylsilane. A 2% aqueous HCl solution (67.1 g) then was slowly added to the mixture over a half hour period with vigorous stirring. The mixture was heated to 70° C. with nitrogen sparge to remove methanol, following which the mixture was further heated to 90° C. for 10 minutes, and then cooled and diluted with approximately 300 ml toluene. The toluene solution was separated and washed repeatedly with water and aqueous sodium bicarbonate solution. Toluene was then removed under reduced pressure to yield a liquid resin with a viscosity of 23,000 cps, as the Resin B reactive silicone (meth)acrylate.

EXAMPLE 3

Synthesis of Resin C—Reactive Silicone (Meth) Acrylate

A 1 liter 3-necked round-bottom flask equipped with a mechanical stirrer, thermometer and an addition funnel, was charged with 42.4 grams dimethyldimethoxysilane, 57.5 grams phenyltrimethoxysilane, and 114.1 grams methacryloxypropyltrimethoxysilane. With rapid stirring, 57.3 g of a 2% aqueous HCl solution was slowly added to the mixture over a one hour period. The mixture then was heated to 75° C. for one hour, with removal of methanol. The mixture was further heated to 90° C. for approximately 10 minutes and then was allowed to cool to room temperature, following which the material was washed with aqueous sodium bicarbonate. The mixture then was diluted with approximately 300 ml of toluene, washed repeatedly with water and dried. Toluene was removed under reduced pressure, to yield a clear liquid with a viscosity of 420 cps, as Resin C reactive silicone (meth)acrylate.

EXAMPLE 4

Synthesis of Resin D—Reactive Silicone (Meth) Acrylate

A two liter 3-necked round-bottom flask equipped with a mechanical stirrer, thermometer and an addition funnel, was charged with 466 grams of toluene, 152.2 grams of trimethylchlorosilane, 237.6 grams of phenyltrimethoxysilane, and 347.2 grams of methacryloxypropyl-trimethoxysilane. Under rapid stirring conditions, 404 grams of water were slowly added to the solution. An exothermic reaction ensued, causing the temperature of the mixture to rise to 60° C. After the addition of water, the mixture was further heated to 90° C. for 4 hours. While the mixture was still warm (50° C.), washing with aqueous sodium bicarbonate solution was initiated. The mixture was repeatedly washed with aqueous sodium bicarbonate solution until neutral character was achieved, and then further washed with water. Phase inversion was observed during washing. The mixture was further diluted with 1 liter of hexane and dried over magnesium sulfate overnight. The mixed solvent was then evaporated under reduced pressure, yielding a resin having a viscosity of 2660 cps, as Resin D reactive silicone (meth)acrylate.

EXAMPLE 5

Formulation of Sample A Threadlocker Composition

A preapplied threadlocker formulation was prepared as an emulsion in water of Resin A reactive silicone (meth)

acrylate. The threadlocker composition (Sample A) had the following formulation:

| Sample A Threadlocker Composition | |
|---|---|
| Deionized water | 50.00 |
| Ammonium benzoate | 1.00 |
| Acrysol ASE-60 polyacrylic acid emulsion (Rohm & Haas, Philadelphia, PA) | 7.60 |
| n-Butyl ferrocene | 0.06 |
| Resin A reactive silicone methacrylate resin | 39.84 |
| Ammonium hydroxide (30%) | 1.50 |

In the preparation of the above-tabulated formulation, the ammonium benzoate was dissolved in the water and the polyacrylic acid emulsion then was added with moderate stirring. The reactive silicone (meth)acrylate resin and other (meth)acrylate resins were added with somewhat more vigorous stirring to form an emulsion. The n-butyl ferrocene was stirred into this emulsion.

The final step in the preparation of the slurry was neutralization with ammonium hydroxide under very vigorous stirring conditions. This caused immediate thickening to a consistency similar to that of sour cream. The resulting emulsion is stable and can be stored until needed for coating onto threaded parts.

The slurry was prepared for coating by adding to 27.92 grams of the emulsion 1.00 gram of microencapsulated benzoyl peroxide. The resulting mixture was blended with a wooden spatula until uniform dispersion of the microcapsules was obtained, to yield the threadlocker composition.

EXAMPLE 6

Formulation of Samples B, C, and D Threadlocker Compositions

The procedure of Example 5 was repeated in the synthesis of other threadlocker formulations (Samples B, C, and D), but with the following modifications:

Sample B:

Instead of 39.84 weight % Resin A reactive silicone (meth)acrylate, the formulation used 10% Resin A, together with 29.84% of ethoxylated bisphenol A dimethacrylate;

Sample C:

Instead of 39.84 weight % Resin A reactive silicone (meth)acrylate, the formulation used 20% Resin A, together with 19.84% of ethoxylated bisphenol A dimethacrylate; and Sample D:

Instead of 39.84 weight % Resin A reactive silicone (meth)acrylate, the formulation used 39.84% of ethoxylated bisphenol A dimethacrylate. All other ingredients of Samples B, C, and D were the same as identified hereinabove for Sample A.

EXAMPLE 7

Threadlocking Performance of Samples A–D Threadlocker Compositions

Each of the Sample A, B, C and D threadlocker compositions was coated onto degreased M10X1.25 steel bolts which had been subjected to a zinc phosphate anti-corrosion treatment commonly known as "Phos and Oil."

A strip of the threaded surface about 12–15 mm wide was covered around the circumference of each bolt. After the bolts were coated with the threadlocker composition slurry, they were sprayed with a deionized water emulsion containing 10% LabOil 72D, a corrosion inhibiting oil. The bolts then were dried in a forced air circulation oven at 60° C. for one hour.

The test specimens were assembled by threading a steel nut over the coated portion of the bolt. The test assemblies were allowed to stand at room temperature (25°±5° C.) for 72 hours. After this time the torque required to break the bond between the nut and bolt (break) and the average torque required to turn the nut through 360° (prevail) were recorded (in units of inch-pounds). A heat resistance test was carried out by placing the test assemblies into a 500° F. (260° C.) oven for 2 hours and then recording the break and prevail torque in inch-pounds as before, within 25 seconds after removal from the oven.

The results are set out in Table I below, together with the formulations of each Sample threadlocker composition, for ease of reference.

Note that the formulations as shown in Table I do not include the peroxy initiator in the tabulated information, in consequence of which the components listed in the Table total to 100%. The formulations listed in Table I were therefore made up in the proportions shown, and then subsequently, the microcapsules containing the peroxy initiator were dispersed into the respective formulations to complete the corresponding compositions.

TABLE I

Formulation and Performance of Sample A-D Threadlocker Compositions

| Threadlocker Composition Sample Application Mode | Sample A Pre-applied | Sample B Pre-applied | Sample C Pre-applied | Sample D Pre-applied |
|---|---|---|---|---|
| Ethoxylated-bis-Phenol-A-di(meth)acrylate | | 29.84 | 19.84 | 39.84 |
| Resin A Reactive Silicone Methacrylate | 39.84 | 10.00 | 20.00 | |
| De ionized water | 50.00 | 50.00 | 50.00 | 50.00 |
| Ammonium Benzoate | 1.00 | 1.00 | 1.00 | 1.00 |
| Acrysol ASE-60 | 7.60 | 7.60 | 7.60 | 7.60 |
| Butyl Ferrocene | 0.06 | 0.06 | 0.06 | 0.06 |
| 30% Ammonium Hydroxide | 1.50 | 1.50 | 1.50 | 1.50 |
| 72 Hr P&O/Stl, Break and Prevail Values, in inch-pounds | 124/221 | 174/273 | 155/210 | 98/184 |
| 500F P&O/Stl | 83/51 | 62/34 | 80/47 | 44/24 |

While the invention has been described herein in reference to various illustrative aspects, features, details, and embodiments, it will be appreciated that the utility of the invention is not thus limited, but rather that the invention is susceptible of numerous variations, modifications, and other embodiments, and accordingly, all such variations, modifications, and other embodiments are therefore contemplated within the spirit and scope of the invention as hereafter claimed.

What is claimed is:

1. A curable composition, having utility for adhesively bonding matably engageable structural elements, said curable composition comprising: a reactive silicone (meth) acrylate emulsified in an aqueous medium; and a microencapsulated peroxy initiator which is initiatingly effective for cure of the reactive silicone (meth)acrylate.

2. A composition according to claim 1, further comprising a polymerizable non-silicone (meth)acrylate monomer or oligomer.

3. The composition according to claim 1, wherein the peroxy initiator comprises an initiator selected from the group consisting of peroxides and peroxy acids.

4. A composition according to claim 1, which is substantially devoid of organic solvents and contains an effective amount of an organic or inorganic base to maintain a pH range from about 2 to about 12.

5. A curable composition, having utility for adhesively bonding matably engageable structural elements, said curable composition comprising:
(a) an aqueous emulsion comprising a reactive silicone (meth)acrylate formed as the reaction product of:
(i) at least one first silane of formula I:

$$R_nSi(X)_{4-n} \qquad (I)$$

wherein:
each R is independently selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups,
X is a hydrolyzable functionality, and
n is an integer of from 0 to 3, and
(ii) at least one second silane of formula II:

$$R^1{}_mR^2{}_pSi(X)_{4-(m+p)} \qquad (II)$$

wherein $R^1$ is a silicon-bonded (meth)acrylic functional group and each $R^2$ is independently selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl,
X is a hydrolyzable functionality,
m is an integer from 1 to 3 inclusive, and
m+p is an integer from 1 to 3 inclusive; and
(b) a microencapsulated polymerization initiator dispersed in said aqueous emulsion.

6. The composition according to claim 5, wherein said aqueous emulsion further comprises a non-silicone polymerizable (meth)acrylate monomer or oligomer.

7. The composition according to claim 5, wherein said at least one second silane constitutes from about 1 to about 99 mole % of the total of said at least one first silane and said at least one second silane.

8. The composition according to claim 5, wherein said at least one second silane constitutes from about 10 to about 70 mole % of the total of said at least one first silane and said at least one second silane.

9. The composition according to claim 5, wherein said at least one second silane constitutes from about 20 to about 50 mole % of the total of said at least one first and said at least one second silane.

10. The composition according to claim 5, wherein the reactive silicone (meth)acrylate is present in an amount constituting from about 40 to about 95 weight % of the composition.

11. The composition according to claim 5, wherein the reactive silicone (meth)acrylate is present in an amount constituting from about 50 to about 90 weight % of the composition.

12. The composition according to claim 5, wherein the reactive silicone (meth)acrylate is present in an amount constituting from about 60 to about 85 weight % of the composition.

13. The composition according to claim 6, wherein the non-silicone polymerizable organic (meth)acrylate monomer is present in an amount constituting from about 1 to about 60 weight % of the composition.

14. The composition according to claim 6, wherein the non-silicone polymerizable organic (meth)acrylate monomer is present in an amount constituting from about 5 to about 50 weight % of the composition.

15. The composition according to claim 6, wherein the polymerizable organic (meth)acrylate monomer is present in an amount constituting from about 10 to about 40 weight % of the composition.

16. The composition according to claim 5, wherein the polymerization initiator is present in an amount constituting from about 0.01 to about 10 weight % of the composition.

17. The composition according to claim 5, wherein the hydrolyzable functionality is selected from the group consisting of halogen, methacryloxy, alkoxy, aryloxy, isocyanato, amino, acetoxy, oximinoxy, aminoxy, amidato, and alkenyloxy.

18. The composition according to claim 5, wherein each R is independently selected from the group consisting of $C_1$–$C_{12}$ alkyl and $C_6$–$C_{12}$ aryl.

19. The composition according to claim 5, wherein said at least one first silane is selected from the group consisting of dimethyl dichlorosilane, phenyltrichlorosilane, tetrachlorosilane, trimethylchlorosilane, trimethylmethoxysilane, dimethyldimethoxysilane, phenyltrimethoxysilane, and tetraethoxysilane.

20. The composition according to claim 6, wherein the non-silicone polymerizable monomer or oligomer is selected from the group consisting of 2-hydroxyethyl (meth)acrylate, polyethylene glycol di(meth)acrylate and dihydrodicyclopentadienyloxyethyl (meth)acrylate.

21. The composition according to claim 5, wherein said silicon-bonded (meth)acrylic functional group $R^1$ is selected from the group consisting of (meth)acryloxyalkyl, (meth)acryloxyalkenyl, and (meth)acryloxyaryl.

22. The composition according to claim 5, wherein the silicon-bonded methacrylic functional group $R^1$ is methacryloxypropyl.

23. The composition according to claim 5, wherein each $R^2$ is selected from the group consisting of $C_1$–$C_{12}$ alkyl, $C_6$–$C_{12}$ aryl, alkenyl, (meth)acryloxy, and vinyl.

24. The composition according to claim 5, wherein said at least one second silane is selected from the group consisting of (meth)acryloxypropyl trichlorosilane, (meth)acryloxypropyl trimethoxysilane, (meth)acryloxypropyl dimethylchlorosilane, (meth)acryloxymethyl methyldichlorosilane and (meth)acryloxymethyldimethyl(meth)acryloxysilane.

25. The composition according to claim 5, wherein the peroxy initiator is selected from the group consisting of peroxides and peroxy acids.

26. The composition according to claim 5, wherein the peroxy initiator is selected from the group consisting of benzoyl peroxide, cumene hydroperoxide, p-methane hydroperoxide, diisopropyl benzene hydroperoxide, pinene hydroperoxide, methyl ethyl ketone hydroperoxide, t-butyl-2-hydroxyethyl peroxide, t-butyl peroxymaleic acid and t-butyl hydroperoxide.

27. The composition according to claim 5, wherein the peroxy initiator is benzoyl peroxide.

28. The composition according to claim 5, which is curable by shearingly and/or compressively releasing the microencapsulated peroxy initiator during engagement of engagable members of a threaded mechanical fastener including an engagement surface to which the composition has been applied.

29. A threadlocking formulation having the following composition by weight:

| Component | Weight Percentage |
|---|---|
| Water | 40–60 |
| Ammonium benzoate | 0.5–5 |
| Polyacrylic acid emulsion | 2.6–10 |
| n-Butyl ferrocene | 0.01–.25 |
| Silicone (meth)acrylate resin | 20–60 |
| Ammonium hydroxide | 0.5–2.5 |
| Microencapsulated benzoyl peroxide | 0.2–5 | wherein the weight percentage of all components totals to 100%.

30. An aqueous curable composition, having utility for adhesively bonding matably engageable structural elements, said curable composition comprising:

a reactive silicone (meth)acrylate emulsified in an aqueous medium;

a microencapsulated peroxy initiator which is initiatingly effective for cure of the reactive silicone (meth) acrylate; and a compatible organic or inorganic base, in an amount effective (i) to maintain pH of the composition in the range of from about 2 to about 12, and (ii) to impart to the composition a Brookfield viscosity of from about 60,000 and about 100,000 centipoise when viscosity of the composition is measured at 25° C. on a Brookfield RVF viscometer with a #6 spindle at 2 rpm rotational speed.

31. A composition according to claim 30, wherein the base is selected from the group consisting of ammonium hydroxide and sodium hydroxide.

32. An aqueous emulsified, curable composition, having utility for adhesively bonding matably engageable structural elements, said curable composition comprising:

a reactive silicone (meth)acrylate;

a polymerizable non-silicone organic (meth)acrylate monomer or oligomer;

a microencapsulated peroxy initiator which is initiatingly effective for cure of the reactive silicone (meth)acrylate; and a compatible organic or inorganic base for pH and viscosity control of the composition.

33. A composition according to claim 32, wherein the composition has a Brookfield viscosity of from about 60,000 and about 100,000 centipoise when viscosity of the composition is measured at 25° C. on a Brookfield RVF viscometer with a #6 spindle at 2 rpm rotational speed, and a corresponding viscosity of from about 18,700 to 36,000 at 20 rpm rotational speed.

* * * * *

UNITED STATES PATENT AND TRADEMARK OFFICE
CERTIFICATE OF CORRECTION

PATENT NO. : 5,635,546
DATED : June 3, 1997
INVENTOR(S) : Richard D. Rich, et al.

It is certified that error appears in the above-indentified patent and that said Letters Patent is hereby corrected as shown below:

Col. 10, line 44   change "mount" to --amount--
Col. 16, line 8    add "non-silicone" before "polymerizable"
Col. 18, line 16   add the text "silicone (meth)acrylate; and" to the end of line 15

Signed and Sealed this

Eighteenth Day of November 1997

Attest:

BRUCE LEHMAN

*Attesting Officer*         *Commissioner of Patents and Trademarks*